July 12, 1966    C. E. FISHER    3,260,566
METHOD OF TREATING EXHAUST GASES OF INTERNAL COMBUSTION ENGINES
Filed July 19, 1962    2 Sheets-Sheet 1
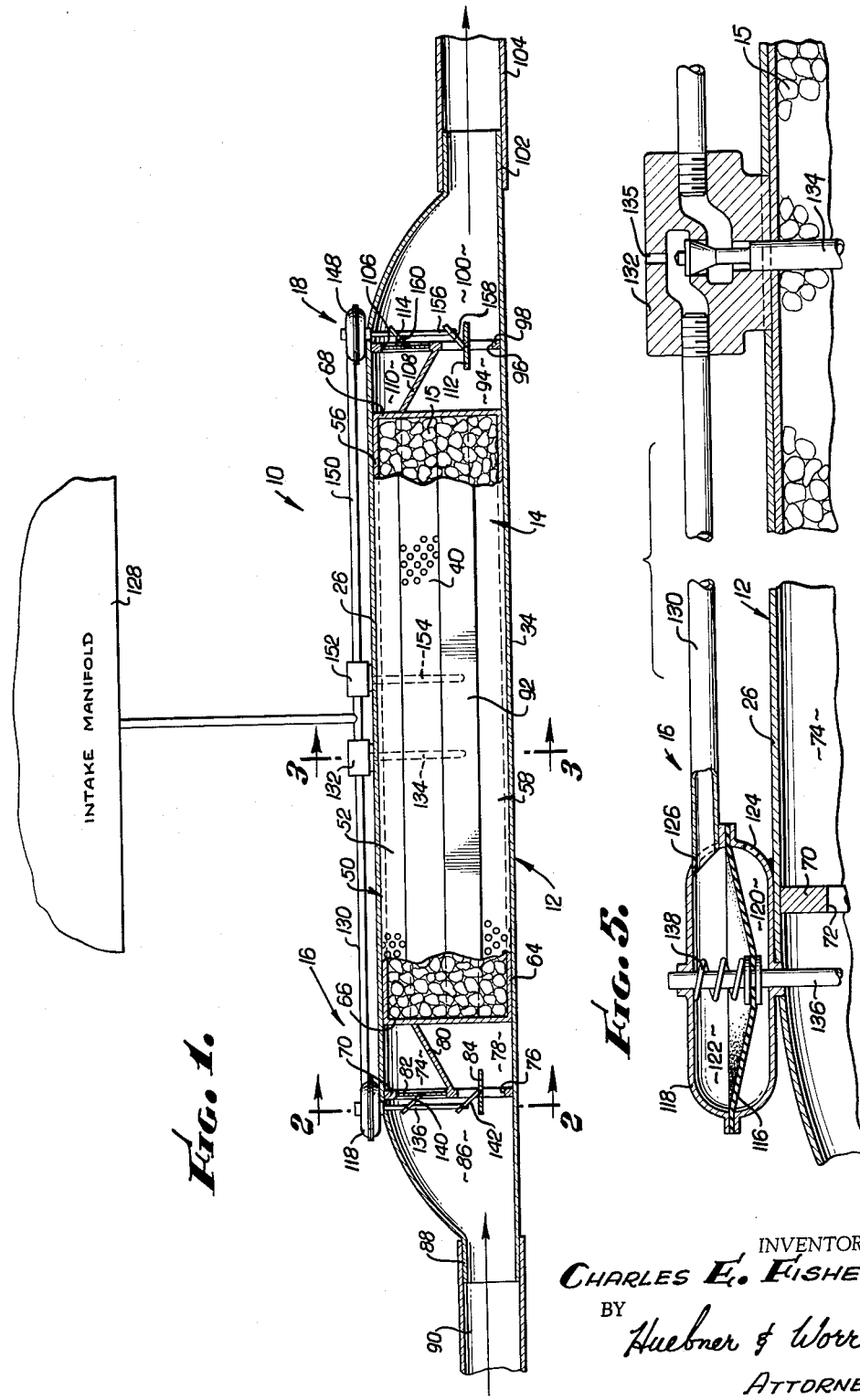
INVENTOR.
CHARLES E. FISHER
BY Huebner & Worrel
ATTORNEYS.

July 12, 1966  C. E. FISHER  3,260,566
METHOD OF TREATING EXHAUST GASES OF INTERNAL COMBUSTION ENGINES
Filed July 19, 1962  2 Sheets-Sheet 2
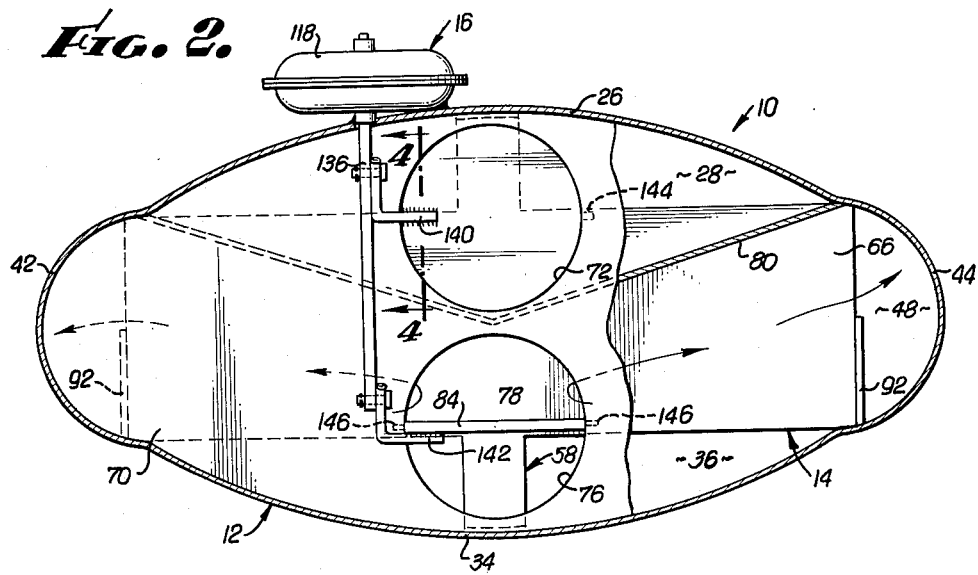
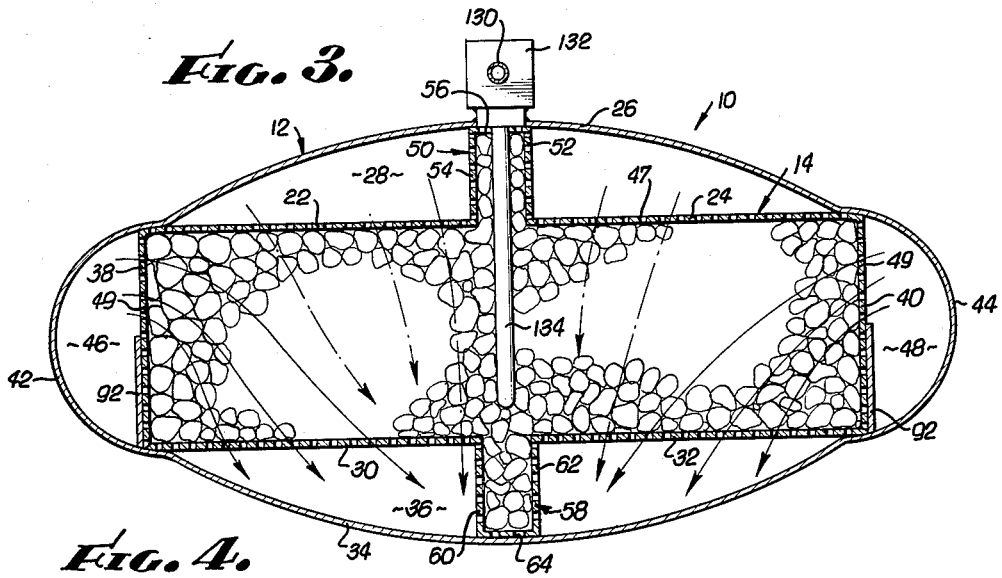
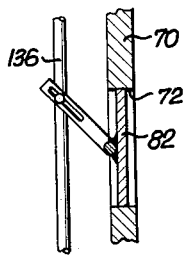
INVENTOR.
CHARLES E. FISHER
BY
Huebner & Worrel
ATTORNEYS.

United States Patent Office 3,260,566
Patented July 12, 1966

3,260,566
METHOD OF TREATING EXHAUST GASES OF INTERNAL COMBUSTION ENGINES
Charles E. Fisher, La Mirada, Calif., assignor to Norris-Thermador Corporation, Los Angeles, Calif., a corporation of California
Filed July 19, 1962, Ser. No. 211,040
6 Claims. (Cl. 23—2)

The present invention relates to catalytic mufflers employed in internal combustion engine exhaust systems for catalytically oxidizing previously unoxidized or only partially oxidized components of the exhaust gases which are harmful when released into the atmosphere, such as hydrocarbons and carbon monoxide, and it relates particularly to a catalytic muffler structurally arranged so that exhaust gases initially produced by the engine enter the muffler and follow a generally side flow path which results in the exhaust gases contacting a relatively narrow frontal area of exposed catalyst to heat and thus initiate catalyst activity, and once the catalyst is partially activated, the flow of the exhaust gases is altered which results in the exhaust gases following a generally vertically-directed flow path, usually downwardly, and in following the latter flow path contacting a relatively large frontal area of catalyst to achieve thorough oxidization of unoxidized exhaust components.

Although various devices have been proposed for use in vehicles with internal combustion engine exhaust systems for reducing or eliminating "smog"-forming and other harmful exhaust gas components, such as unburned or partially burned hydrocarbons and carbon monoxide, the most practical and efficient apparatus for accomplishing this appears to be the catalytic muffler which is employed in the exhaust system as a replacement for the conventional muffler. Such a catalytic muffler has a catalyst material disposed therein; usually a bed of particulate catalyst material, which promotes oxidization of such previously unburned or only partially burned exhaust components, and this chemical action is exothermic; i.e., produces heat. It is well-known in the art to introduce air into the exhaust conduit upstream of the catalytic muffler to provide the required oxidizing condition in the stream of gases which passes through the catalytic muffler.

It has been found that if the catalyst bed of the catalytic muffler has a relatively large frontal area exposed to the incoming exhaust gases, a greater area is made available for treating the exhaust gases and for distributing certain exhaust components which have the effect of poisoning the catalyst and reducing its activity and efficiency. The poisoning contaminants of the exhaust gases are generally concentrated at the upstream side of the catalyst and, therefore, a large frontal area of catalyst dilutes the concentration of the poisoning contaminants. A large frontal area of exposed catalyst, therefore, provides a longer-life catalyst muffler than one with a relatively narrow frontal area.

However, contemporary vehicles with their relatively limited road clearance impose structural limitations on catalytic mufflers, the limitations being such that the width of the muffler between the top wall and the bottom wall is generally required to be less than the width between the side walls. The result of these structural limitations is that in order to provide a catalytic muffler having a relatively large frontal area of exposed catalyst, a vertical-flow muffler is provided; i.e., the exhaust gases entering the catalytic muffler flow in a vertical path, usually downwardly, through the catalyst material.

Additionally, the properties of the catalyst material present certain problems. Most, if not all, presently-known catalyst materials which are applicable for use in catalytic mufflers are not active at normal atmospheric temperatures, and therefore, activation of the catalyst is achieved with the application of heat, usually hot exhaust gases. In the situation where large frontal areas of catalyst material are exposed to incoming exhaust gases, an extended period of time is required to heat the catalyst with the exhaust gases to a temperature level where the catalyst becomes active. In the meantime, unoxidized exhaust components are being discharged into the atmosphere. It has been determined that the rate of heat transfer for any incremental volume of catalyst material is a function of exhaust gas temperatures and the velocity of the exhaust gases passing over that incremental volume. Therefore, a relatively narrow frontal area of catalyst material produces a greater heat transfer to increments of the catalyst and accelerates heat transfer. But, because of the narrow frontal area of the catalyst material, it is either prematurely poisoned by components in the exhaust gases or the catalyst activity is prematurely exhausted if the narrow frontal area is exposed for an extended period of time.

Thus, it is an object of this invention to provide a catalytic muffler having a case and catalyst disposed therein which has a relatively large frontal or cross-sectional area of catalyst material and relatively narrow frontal or cross-sectional area of catalyst material exposed to exhaust gases, and included in the catalytic muffler is a valving system for directing the exhaust gases so they will contact the narrow frontal area to initiate the catalytic reaction and for directing the exhaust gases so they will contact the large frontal area whereby the unoxidized or only partially oxidized exhaust components will be oxidized.

A yet further object of this invention is to provide a catalytic muffler of the aforementioned character wherein the relatively narrow frontal area of the catalyst material is partially shielded so as to further reduce this frontal area, and the shielding is so arranged as to cause the flowing exhaust gases to approach the relatively large frontal area to produce strategically-located hot spots in the region of the large frontal area of catalyst material.

A more specific object of this invention is to provide a catalytic muffler of the aforementioned character wherein the valving system is actuated by thermal-responsive means, whereby the exhaust gases will be directed through the flow path having the relatively narrow frontal area when the catalyst is relatively cool so as to initiate catalyst activity, and the exhaust gases will be directed through the flow path having the relatively large frontal area when the catalyst is relatively hot so as to minimize catalyst poisoning and have efficient catalyst activity for a long period of catalyst use.

Another specific object of this invention is to provide a catalytic muffler of the aforementioned character wherein the catalytic muffler is composed of a pair of basic units; a muffler case and a cartridge which includes the catalyst material, the cartridge embodying ribs which provide reinforcement for the case.

A still further object of this invention is to provide a process for treating exhaust gases produced in an internal combustion engine wherein the exhaust gases initially produced by the engine are caused to flow in one direction so as to contact a relatively narrow frontal area of catalyst disposed in a catalytic muffler to initiate the catalytic reaction, and the exhaust gases subsequently produced by said engine are caused to flow in another direction so as to contact a relatively large frontal area of catalyst to achieve thorough oxidization of those components in the exhaust gases not oxidized or only partially oxidized.

A serious problem exists in connection with catalytic mufflers which is that under certain conditions of engine operation excessively high concentrations of unburned materials are produced by the engine and passed through the exhaust system, which results in the production of an excessive amount of heat in the catalytic muffler. This excessive heat production in the catalytic muffler can damage the catalyst, the container, and could even be damaging to adjacent underside parts of the vehicle, such as brakes or the like. Excessive heat in the muffler will also tend to accelerate oxidization of the metal which forms the muffler case, thus further tending to reduce the life of the muffler.

In view of the immediate preceding problem, it is an object of this invention to provide a catalytic muffler of the aforementioned character wherein excessive heat production in the catalyst will result in actuating a valving system to make available to the exhaust gases a passage through the muffler which by-passes the catalyst, until such time as the temperature of the catalyst returns to acceptable limits.

Another object of this invention is to provide a process of the aforementioned character wherein the exhaust gases entering into the presence of the catalyst are caused to by-pass the catalyst when the temperature of the catalytic muffler exceeds an acceptable temperature range.

Further objects and advantages of the present invention will appear during the course of the following part of the specification wherein the details of construction, mode of operation and novel process steps of a preferred embodiment are described with reference to the accompanying drawings, in which:

FIGURE 1 is a longitudinal, vertical sectional view, partly in elevation, illustrating the catalytic muffler case, the catalyst cartridge disposed in the case and the valving system for controlling the direction of flow of the exhaust gases;

FIGURE 2 is an enlarged vertical sectional view, partly in elevation, taken on line 2—2 of FIGURE 1;

FIGURE 3 is an enlarged vertical sectional view, partly in elevation, taken on line 3—3 of FIGURE 1;

FIGURE 4 is a fragmentary vertical sectional view, partly in elevation, taken on line 4—4 of FIGURE 2, and illustrating details of a portion of the valving system; and FIGURE 5 is an enlarged fragmentary longitudinal, vertical sectional view, partly in elevation, illustrating the valving system employed for operating butterfly valves used to control the directional flow of the exhaust gases through the catalytic muffler.

A catalytic muffler broadly designated 10, to be employed with an internal combustion engine, is shown particularly in FIGURE 1, as being composed of a pair of principal units; an elongated metal case 12, and a catalyst cartridge 14 longitudinally disposed in the case, the cartridge being substantially entirely filled with a particulate catalyst material 15, to thereby provide a catalyst bed. Although not shown, case 12 may be constructed so that the cartridge may be readily installed in and removed from the case. A valving system 16 is employed to control the directional flow of internal combustion engine exhaust gases into the case, and a valving system 18 is employed to control the directional flow of the exhaust gases from the case, the condition of valving systems 16 and 18 also determining whether or not the exhaust gases pass through the catalyst bed 15.

When cartridge 14 is installed in the case 12, in the manner illustrated in FIGURES 1 and 3, top horizontal perforated plates 22 and 24 of the cartridge in combination with top convex wall 26 of the case define a longitudinal upper or top plenum chamber 28 into which exhaust gases are directed by valving system 16, bottom horizontal perforated plates 30 and 32 of cartridge 14 in combination with bottom convex wall 34 of the case 12 define a longitudinal lower or bottom plenum chamber 36. The cartridge also includes vertical side perforated plates 38 and 40 which in combination with convex side walls of the cases 42 and 44, respectively, define longitudinal side plenum chambers 46 and 48, respectively, into which exhaust gases are directed by valving system 16. The manner of directing the exhaust gases into the upper plenum chamber and the side plenum chambers by valving system 16 will hereinafter be described in detail. FIGURES 2 and 3 disclose that the convex curvature of side walls 42 and 44 is more pronounced than the convex curvature of top and bottom walls 26 and 34, the convexity of the top wall and the side walls functioning for the purpose of directing the exhaust gases into the catalyst bed 15. The depth of the cartridge and catalyst bed between the top horizontal plates 22 and 24 and the bottom horizontal plates 30 and 32 is less than the width beween side plates 38 and 40, thus presenting a catalyst bed 15 which has a relatively large frontal area upper surface 47, the side surfaces 49 being relatively narrow in comparison.

Cartridge 14 also embodies an upwardly-extending and longitudinal rib 50 which provides a stiffener and reinforcement for wall 26. The rib is defined by a pair of vertical and spaced perforated plates 52 and 54, and a perforated horizontal cap 56, the latter being in firm abutting engagement with top wall 26. The rib also provides a central longitudinal partition for plenum chamber 28. Rib 50 is substantially entirely filled with the particulate catalyst material making up catalyst bed 15, and the catalyst material in the rib contributes to oxidizing the unoxidized exhaust components in the exhaust gases.

Bottom wall 34 is also stiffened or made more rigid and resistant to heat by a longitudinal rib 58 which extends downwardly from cartridge 14, and is defined by vertical and spaced perforated plates 60 and 62, and perforated cap 64 which is in firm abutting engagement with bottom wall 34. Rib 58 provides a longitudinal central partition for lower plenum chamber 36, and like rib 50, rib 58 is substantially entirely filled with particulate catalyst which makes up bed 15, and also like rib 50, the catalyst material in rib 58 will contribute to oxidizing unoxidized components of the exhaust gases.

The left end of the cartridge or the forward end, as seen in FIGURE 1, is enclosed by an imperforate forward end plate 66 which has a shape as defined by the cross-sections of the catalyst cartridge 14 and the lower plenum chamber 36. An imperforate rear plate 68 encloses the rear end of the cartridge or the right end as viewed in FIGURE 1, and has a shape as defined by the cross-sections of the catalyst cartridge 14 and the two side plenum chambers 46 and 48.

It thus may be seen that the cartridge is a self-contained unit defined by perforated plates and caps 22, 24, 30, 32, 38, 40, 52, 54, 56, 60 and 62 and 64, and imperforate end plates 66 and 68.

Spaced forwardly from forward end plate 66 is a vertical bulkhead or panel 70 which spans the distance between the top and bottom walls 26 and 34, and side walls 42 and 44. In bulkhead 70 is an upper port 72 through which exhaust gases pass into an upper passage 74, which communicates with upper plenum chamber 28. Below port 72 is another port 76 through which exhaust gases pass into a lower passage 78 which communicates with side plenum chambers 46 and 48. Upper passage 74 is partitioned from lower passage 78 by an upwardly-inclined divider plate 80 which bridges the distance between bulkhead 70 and end plate 66 as well as side walls 42 and 44.

Ports 72 and 76 are rendered opened and closed by butterfly valves 82 and 84, respectively, which are components of valving system 16.

Forward of bulkhead 70 is an exhaust gas expansion chamber 86, and forwardly of expansion chamber 86 is a reduced opening defined by neck 88 which is connected to an exhaust gas inlet conduit 90.

Exahust gases mixed with air flow through conduit 90 in the direction indicated by the arrow and enter expansion chamber 86 of the muffler 10. It will be understood that the exhaust gases entering the muffler will contain an appropriate amount of air for oxidation in the muffler of the previously unoxidized or only partially oxidized exhaust ingredients. If the exhaust gases are those initially produced when the engine is started and catalyst bed 15 is not at an active temperature level, the exhaust gases pass through port 76 into the lower passage 78. From passage 78 the exhaust gases flow into both side plenum chambers 46 and 48, and through the respective perforated plates 38 and 40 where they contact the relatively narrow frontal area of catalyst bed 15.

The primary purpose of directing the flow of exhaust gases into the side plenum chambers 46 and 48 is to rapidly activate the catalyst, and, more specifically, to rapidly activate the catalyst adjacent to the upper surface 47 which presents a more extensive frontal or cross-sectional area than side surfaces 49 adjacent the side plenum chambers.

The relatively narrow frontal area of exposed catalyst in each of the side plenum chambers is reduced by a longitudinally extending vertical shield or baffle 92 which covers substantially the lower half of the exposed catalyst. As a result of the shield or baffle arrangement, the upper portion of the catalyst in the narrow frontal area is exposed to the exhaust gases. Therefore, exhaust gases entering the side chambers heat and produce hot spots in a region of the catalyst bed 15 adjacent the upper surface 47 of the catalyst where it is desirable to have an active catalyst, and as aforementioned, the rate of heat transfer to any incremental volume of catalyst is a function of exhaust gas temperature and velocity of the gases passing over that increment. Therefore, a relatively small or narrow frontal area gives greater heat transfer to increments of the catalyst and accelerates heat transfer.

The combination of catalyst and exhaust gases produces an exothermic reaction and the heat of reaction occurring imparts a self-supporting catalyst condition which sustains the activity of the catalyst as long as hot unoxidized or only partially oxidized exhaust gases are in the presence of the catalyst.

After the initially produced exhaust gases contact the exposed narrow frontal areas 49 of catalyst bed 15, they follow the path of least resistance and flow downwardly through the catalyst bed 15 and into the lower plenum chamber 36. From the lower plenum chamber the exhaust gases flow toward the rear of the muffler 10 or to the right, as viewed in FIGURE 1, where they enter a lower passage 94 which is substantially identical to passage 78, and from passage 94, the exhaust gases pass through a lower port 96 in a rear vertical bulkhead 98 and into a rear expansion chamber 100. The exhaust gases then flow through a reduced opening defined by a muffler neck 102 and into the exhaust discharge pipe 104, which is in encircling engagement with neck 102.

Bulkhead or panel 98 is spaced from rear end plate 68, and is substantially identical to bulkhead 70. In addition to the lower port 96, bulkhead 98 also has an upper port 106, and spanning the distance between bulkhead 98 and end plate 68 and disposed between ports 96 and 106 is a forwardly-extending and upwardly-inclined divider plate 108 which partitions lower passage 94 from an upper passage 110, the latter being substantially identical to upper passage 74.

Ports 96 and 106 are rendered opened and closed by butterfly valves 112 and 114, respectively, which are components of valving system 18, the details of construction and mode of operation of which will hereinafter be described in greater detail.

Valving system 16 is responsible for controlling the direction of flow of the exhaust gases into the presence of the catalyst. Initially, the valving system 16 directs the exhaust gases through the side plenum chambers 46 and 48, and after the catalyst is activated in the aforementioned manner the valving system alters the direction of flow of the exhaust gases so that they will pass into upper plenum chamber 28. This valving system includes a flexible diaphragm 116 which is supported within a suitable housing 118, mounted on the forward end of the case, so as to divide the inside of housing 118 into a pair of chambers 120 and 122 on opposite sides of the diaphragm. The chamber 120 communicates with the outside of the housing through an opening 124, so as to be at atmospheric pressure.

A port 126 is provided in housing 118 in communication with chamber 122, the port being connected to the intake manifold 128 of the engine through vacuum conduit 130. Vacuum conduit 130 has a valve 132 therein which is mounted on the catalytic muffler 10. The valve includes a temperature-sensing probe 134 which extends into the catalyst bed 15. The temperature-sensing probe 134 may be any suitable thermo-mechanical device capable of actuating valve 132, as, for example, a bimetallic sensor, a gas-filled bulb and bellows device, or a coaxial rod and tube arrangement wherein the rod and tube have different coefficients of thermal expansion.

When the temperature in the catalytic muffler is below the normal operating range, the temperature-sensing probe 134 holds valve 132 in its open position so that the partial vacuum condition within the intake manifold 128 is communicated through vacuum conduit 130 to compartment 122 of diaphragm housing 118 so that chamber 122 will be at a substantially lower pressure than chamber 120, and with valve 132 in this condition the exhaust gases flow into side plenum chambers 46 and 48. However, when the temperature in the catalytic muffler rises above a predetermined value, the sensing probe 134 will cause valve 132 to close, so that the partial vacuum condition within the intake manifold 128 is not communicated to the chamber 122 through conduit 130, and in this condition of valve 132 the exhaust gases flow into upper plenum chamber 28. Valve 132 is shown in its closed position in FIGURE 5.

Valve 132 includes a bleed opening 135 which is closed when the valve is open and the partial vacuum of the intake manifold is communicated to conduit 130, but which is open when the valve is closed so as to permit the return of conduit 130 and chamber 122 to atmospheric pressure.

A vertical shaft 136 is slidably mounted in housing 118 and is connected with diaphragm 116. A coil spring 138 is disposed about shaft 136 in chamber 122, one end of spring 138 seating against housing 118, and the other end of the spring seating against diaphragm 116 so as to bias diaphragm 116 and shaft 136 downwardly, as viewed in FIGURE 5.

A pair of spaced levers 140 and 142 have pivotal, lost motion connections with shaft 136 intermediate the ends thereof, one end of lever 140 being connected to butterfly valve 82, and one end of lever 142 being connected to butterfly valve 84. Butterfly valve 82 is pivotally mounted on bulkhead 70 by pins 144, and butterfly valve 84 is similarly pivotally mounted on bulkhead 70 by pins 146.

When the catalytic muffler 10 is below the normal operating temperature range so that the temperature controlled valve 132 is open, diaphragm 116 and shaft 136 will be held in an upper position by the resulting pressure differential between chambers 120 and 122 on opposite sides of the diaphragm 116, and butterfly valve 82 will render port 72 closed and butterfly valve 84 will render port 76 open, with the result that exhaust gases flowing into the muffler 10 will flow into the side plenum chambers 46 and 48 in the aforementioned manner to produce the aforesaid results. FIGURE 1 illustrates this condition. However, when the temperature of the catalyst bed 15 rises to the predetermined operating value, valve 132 will close to the position shown in FIGURE 5 in response to the temperature rise and the valve bleed opening 135 will be opened to the atmosphere so as to equalize the pressure in chambers 120 and 122 on opposite sides of the diaphragm 116, whereby the spring 138 will move the diaphragm 116 and shaft 136 downwardly to cause butterfly valve 82 to render port 72 open and butterfly valve 84 to close port 76, thus causing the direction of flow of the exhaust gases to change. The exhaust gases will then enter upper passage 74 and flow from there into upper plenum chamber 28 where a large frontal area of catalyst is exposed for oxidizing the unoxidized or partially oxidized components of the exhaust gases.

The exhaust gases entering upper plenum chamber 28 flow downwardly through catalyst bed 15 and into lower plenum chamber 36 from where they flow into passage 94, through port 96 into rear expansion chamber 100, and from there the exhaust gases are discharged through exhaust pipe 104.

Of interest is the fact that exhaust gases passing through the catalyst bed 15, whether it be from side plenum chambers 46 and 48 or downwardly from the upper plenum chamber 28 to lower plenum chamber 36, all pass through one single outlet port 96.

If the temperature of the catalyst bed 15 and thus of the catalytic muffler 10 exceeds acceptable values such as may occur as the result of an unusual amount of unoxidized exhaust gases entering the muffler, valving system 18 operates to cause the exhaust gases to substantially by-pass the catalyst bed.

Valving system 18 is structurally and operationally substantially identical to valving system 16. It includes a housing 148 which is mounted on the rear end of muffler 10 and the structural components therein are substantially identical to those in housing 118. Connecting housing 148 with intake manifold 128 is a vacuum conduit 150 and disposed in the conduit is a temperature controlled valve 152 which is mounted on case 12. Depending from valve 152 is a temperature-sensing probe 154 which extends into the catalyst bed 15.

Depending from the diaphragm within housing 148 and extending into the rear expansion chamber 100 is a shaft 156. Pivotally connected to shaft 156 in spaced relationship is a pair of levers 158 and 160. One end of lever 158 is connected to butterfly valve 112, and one end of lever 160 is connected to butterfly valve 114.

When the temperature of the catalyst bed 15 and muffler 10 is in the normal or below normal operating range, valve 132 is open to provide communication between the intake manifold 128 and conduit 150, so that shaft 156 is in its upper position. Butterfly valves 112 and 114 are then in the positions illustrated in FIGURE 1, and exhaust gases pass through lower port 96. However, when the temperature in the muffler 10 exceeds the acceptable temperature operating range, the temperature-sensing probe 154 causes valve 152 to close to produce the same results as are produced in valving system 16 when temperature-sensing probe 134 closes valve 132. The resulting downward movement of shaft 156 causes butterfly valve 112 to close port 96, and butterfly valve 114 is caused to open port 106.

As a result the exhaust gases entering the upper plenum chamber 28 are caused to by-pass catalyst bed 15 and flow through port 106 into the rear expansion chamber 100, from where they flow into exhaust discharge pipe 104.

The exhaust gases continue to by-pass catalyst bed 15 until the temperature of the catalytic muffler returns to an acceptable operating range when the foregoing operation is reversed, and the exhaust gases are again caused to pass downwardly through the catalyst bed.

The valving systems 16 and 18 as hereinabove described are aranged for "fail safe" operation by having the spring 138 in housing 118 biasing shaft 136 toward the position in which butterfly valves 82 and 84 will channel the exhaust gases into the upper plenum chamber 28, and by having the shaft 156 biased toward the position in which butterfly valves 112 and 114 permit the exhaust gases to flow directly out of upper plenum chamber 28 into rear expansion chamber 100 and thus to by-pass catalyst bed 15. Thus, if a malfunction develops in either or both of the valving systems, the end result will be that the exhaust gases will by-pass the catalyst bed before excessive and damaging temperatures can develop in the catalyst bed. For example, if both valving systems 16 and 18 are malfunctioning, shafts 36 and 56 will both be held in the down positions, causing butterfly valves 82 and 114 to be open, permitting the exhaust gases to pass directly through the upper plenum chamber 28. If only the valving system 16 has a malfunction therein, its butterfly valve 82 will automatically open, and when the temperature in the muffler 10 exceeds the acceptable temperature operating range, probe 154 causes valve 152 to close, resulting in shaft 156 moving downwardly and opening butterfly valve 114 so that the exhaust gases will by-pass the catalyst bed. On the other hand, if only the valving system 18 has a malfunction therein, its butterfly valve 114 will automatically open, and when the temperature in the catalyst bed 15 rises to the predetermined operating value, the probe 134 causes valve 132 to close, resulting in shaft 136 moving downwardly and opening butterfly valve 82, permitting the exhaust gases to by-pass the catalyst bed.

While the instant invention has been shown and described herein in what is conceived to be the most practical and preferred embodiment, it is recognized that departures may be made therefrom within the scope of the invention, which is therefore not be limited to the details disclosed herein, but to be accorded the full scope of the claims.

What I claim is:

1. A process for treating exhaust ingredients produced by an internal combustion engine and containing air which comprises the steps of directing the flow of said exhaust ingredients into a bed of catalytic material, confining said flow in said catalytic material to a first path of relatively small cross-sectional area to effect a relatively rapid heating of the catalyst in said first path to oxidation temperature, and redirecting the flow of said exhaust ingredients into said bed of catalytic material to pass therethrough in a second path of relatively large cross-sectional area, a portion of the catalytic material in said second path having reached oxidation temperature as a result of said flow of exhaust ingredients in said first path, to effect a thorough oxidation of unoxidized components of said exhaust ingredients.

2. A process according to claim 1 which includes the step of detecting the temperature of said catalytic material and performing said redirecting step in response to said material reaching a predetermined temperature.

3. A process according to claim 1 wherein the exhaust ingredients which flow through said first path are directed to enter the bed of catalytic material through one surface region of the bed, and the exhaust ingredients which flow through said second path are redirected so as to enter the bed of catalytic material through a different surface region of the bed.

4. A process according to claim 3 wherein the exhaust gases which flow through both of said paths are conducted through the bed of catalytic material so as to leave the bed from substantially the same surface region of the bed.

5. A process according to claim 1 wherein said bed of catalytic material is of generally flat and wide configuration with relatively wide top and bottom surfaces and relatively narrow edge surfaces, and wherein the exhaust ingredients which flow through said first path are directed to enter the bed of catalytic material through one of said edge surfaces, and the exhaust ingredients which flow through said second path are redirected so as to enter the bed of catalytic material through one of said top and bottom surfaces.

6. A process according to claim 5 wherein the exhaust ingredients which flow through said first path are directed to enter the bed through a limited portion of one of said edge surfaces.

References Cited by the Examiner
UNITED STATES PATENTS

| | | | |
|---|---|---|---|
| 1,902,160 | 3/1933 | Frazier et al. | 23—2.2 |
| 2,776,875 | 1/1957 | Houdry | 23—288 |
| 2,942,932 | 6/1960 | Elliott | 32—2 |
| 2,991,160 | 7/1961 | Claussen | 23—288 |
| 3,025,132 | 3/1962 | Innes | 23—2 |
| 3,090,677 | 5/1963 | Scheitlin et al. | 23—2.2 |

MILTON WEISSMAN, *Primary Examiner.*

MAURICE A. BRINDISI, *Examiner.*

E. C. THOMAS, *Assistant Examiner.*